Feb. 26, 1952                J. R. McVEIGH                2,587,057
        AUTOMOTIVE POWER PLANT WITH AIR PREHEATER AND
        REVERSE AXIAL FLOW THROUGH COMBUSTION CHAMBER
Filed July 12, 1947   TO POWER AND COMPRESSOR TURBINES
                                                4 Sheets-Sheet 3
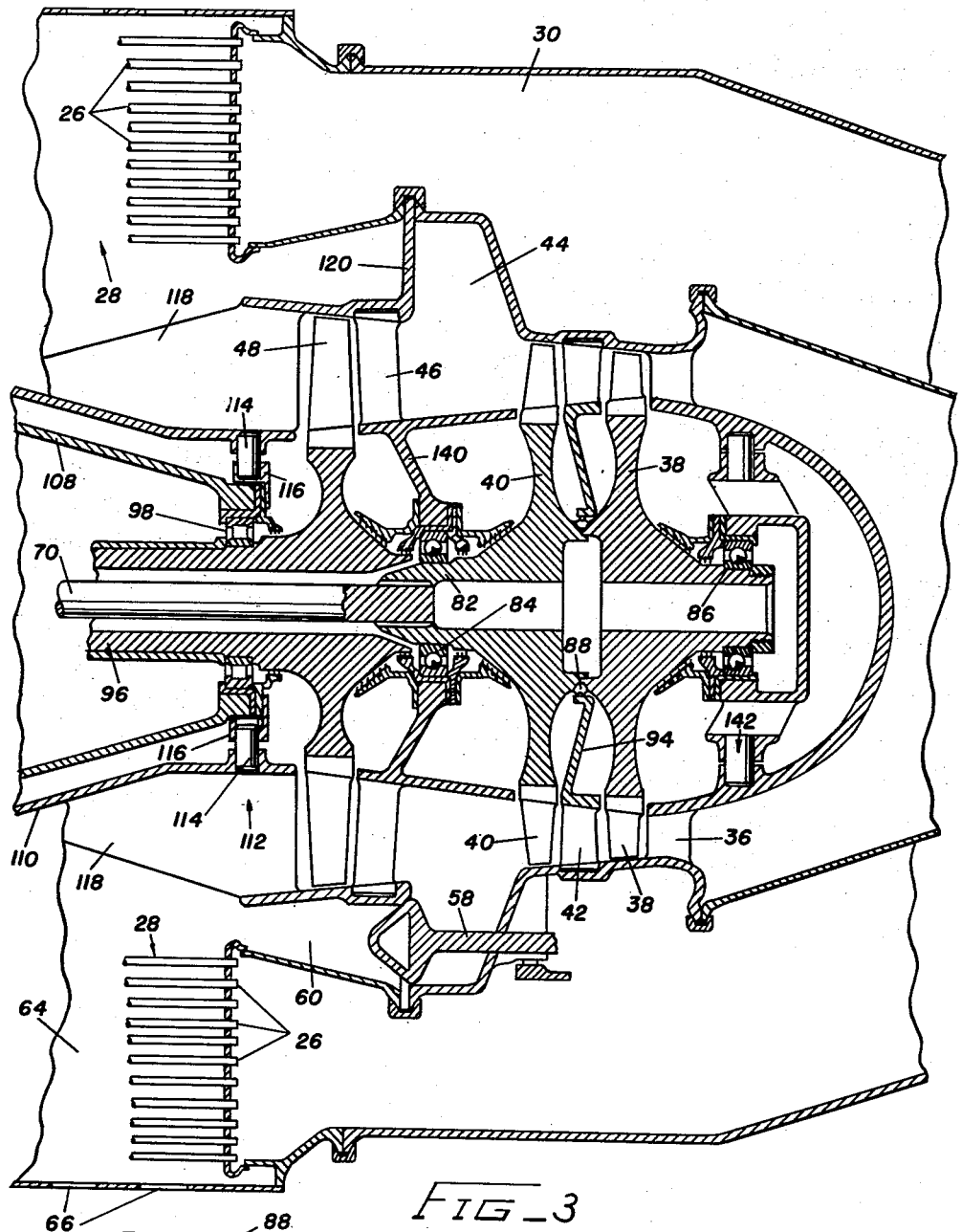
FIG_3
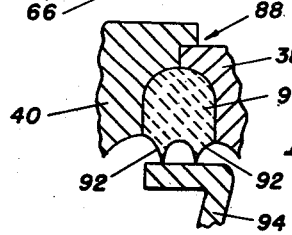
FIG_7
INVENTOR.
JOHN R. McVEIGH
BY
ATTORNEYS.

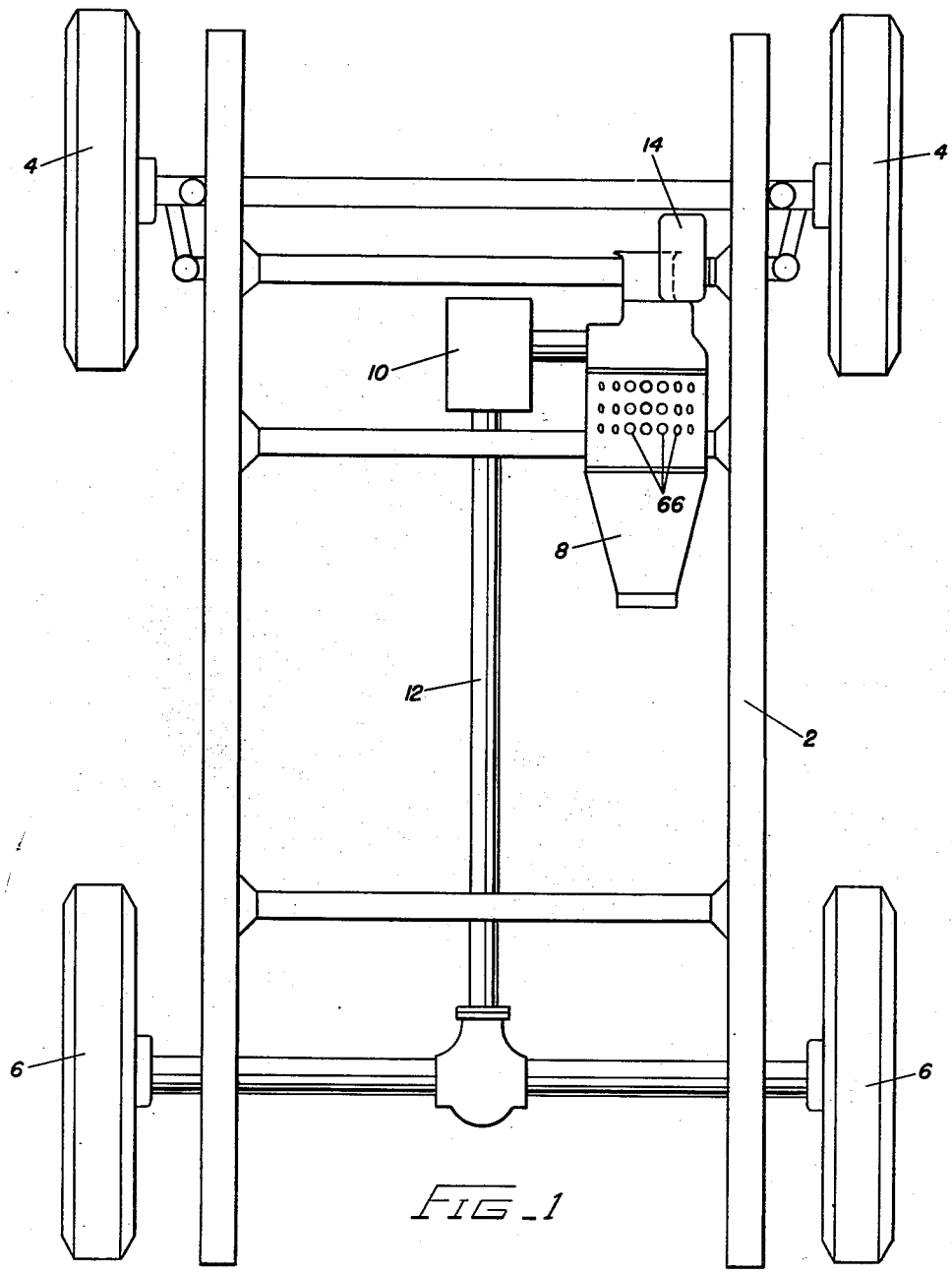
FIG_1

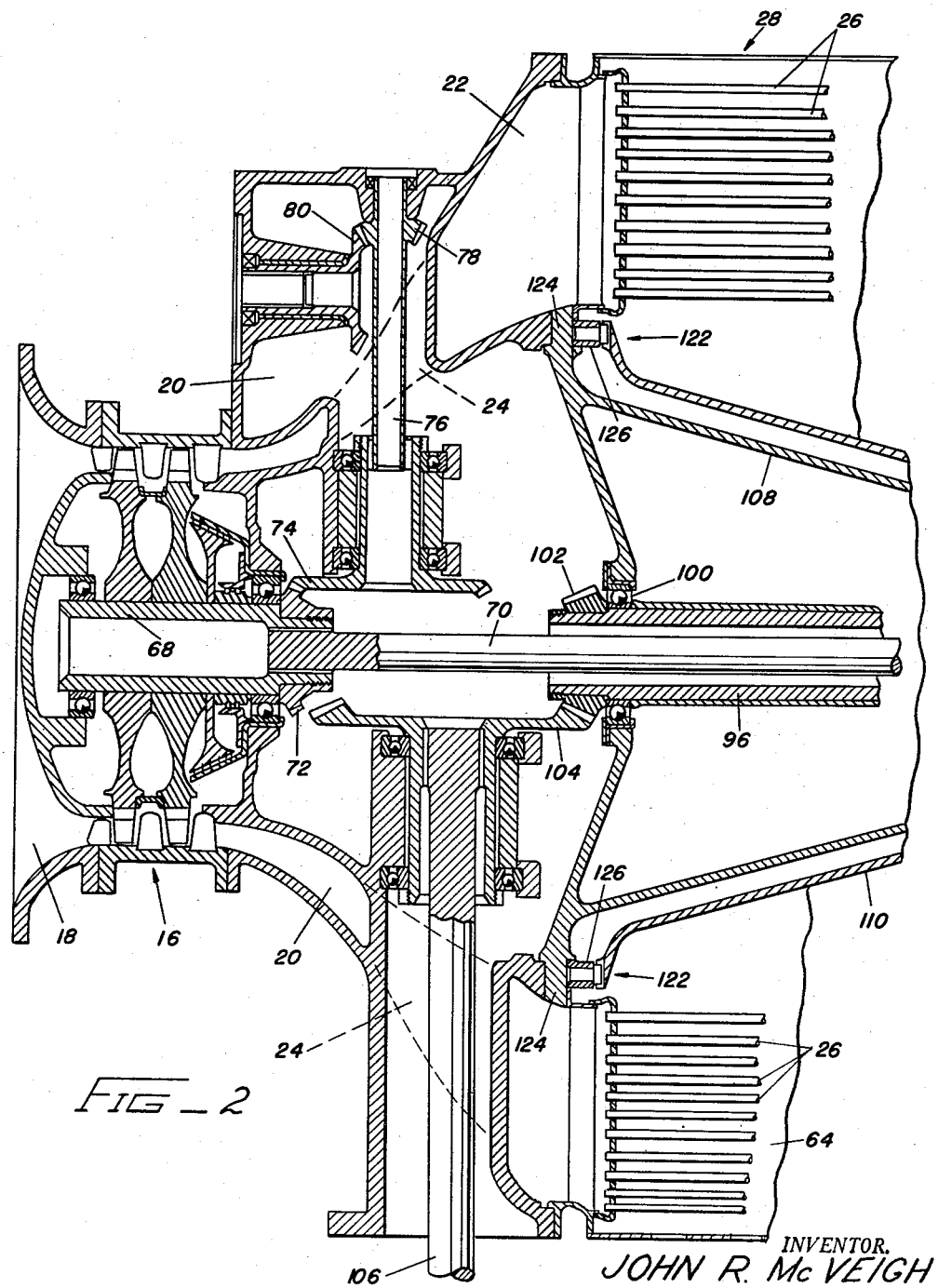
FIG_2

Feb. 26, 1952 J. R. McVEIGH 2,587,057
AUTOMOTIVE POWER PLANT WITH AIR PREHEATER AND
REVERSE AXIAL FLOW THROUGH COMBUSTION CHAMBER
TO POWER AND COMPRESSOR TURBINES
Filed July 12, 1947 4 Sheets-Sheet 4
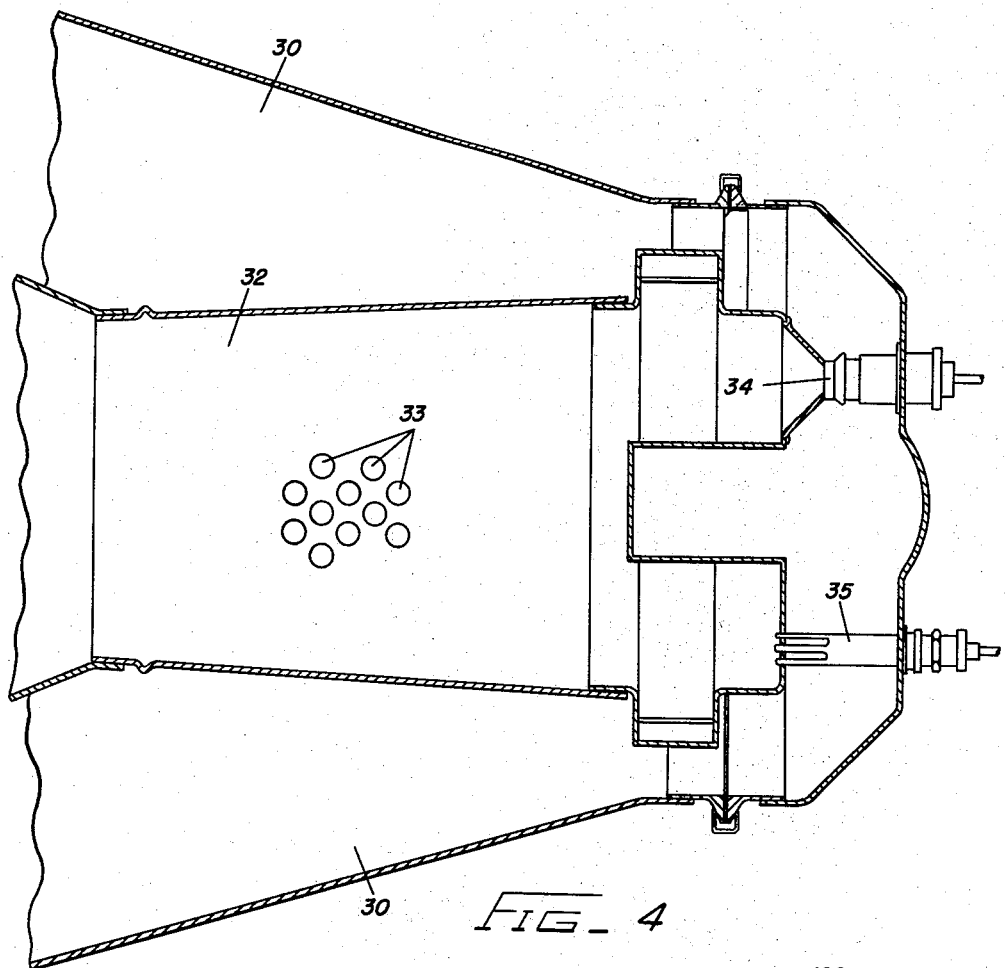
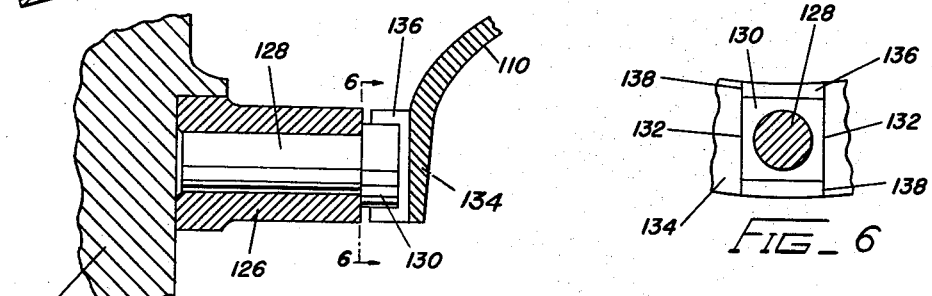
INVENTOR.
JOHN R. McVEIGH
BY
Hauke, Hardesty & Schmidt
ATTORNEYS.

Patented Feb. 26, 1952

2,587,057

UNITED STATES PATENT OFFICE 2,587,057

AUTOMOTIVE POWER PLANT WITH AIR PREHEATER AND REVERSE AXIAL FLOW THROUGH COMBUSTION CHAMBER TO POWER AND COMPRESSOR TURBINES

John R. McVeigh, Detroit, Mich., assignor to Continental Aviation & Engineering Corporation, Detroit, Mich., a corporation of Virginia Application July 12, 1947, Serial No. 760,569

3 Claims. (Cl. 60—39.36)

This invention relates to internal combustion engines of the gas turbine type, specifically to a road vehicle powered by a gas turbine.

One of the problems facing a design engineer who is called upon to design a turbine to drive a road vehicle is that of speed variations. A road vehicle has to be movable at varying speeds; turbine, on the other hand, operate most efficiently at a single given speed.

It is an object of this invention to provide a gas turbine for a road vehicle which is so designed that the turbine, operating through a direct drive transmission, may be operated at varying speeds at a good efficiency. This and other objects are accomplished in a gas turbine having a plurality of turbine wheels. At least one of the turbine wheels is arranged to operate at substantially constant speed, or at the worst at a speed which varies over a very narrow range, and this turbine wheel is connected to drive the air compressor; another turbine wheel rotates independently of the compressor turbine and is connected to the direct drive transmission. A valve is positioned and arranged to enable the by-passing of gas around the turbine wheel which is connected to the transmission.

In the drawings:

Fig. 1 is a view, largely schematic, of a road vehicle chassis showing a gas turbine connected to drive two of the road wheels through a direct drive transmission.

Fig. 2 is a longitudinal section through the compressor end of the turbine.

Fig. 3 is a longitudinal section through the turbine wheel portion of the turbine.

Fig. 4 is a longitudinal section through the combustion chamber end of the turbine.

Fig. 5 is a detail section through a portion of the supporting structure.

Fig. 6 is a view in section on line 6—6 of Fig. 5, and

Fig. 7 is a detail section showing the welded joint holding the two compressor turbine wheels together and showing the gas seal provided at this joint.

Fig. 1 shows a vehicle frame 2 having a pair of dirigible wheels 4 and a pair of traction wheels 6. A combustion engine such as a gas turbine 8 is mounted on the frame to drive the traction wheels through a direct drive transmission 10 and a propeller shaft 12. Transmission 10 is preferably of the direct drive type, in which the drive is accomplished through suitable gearing to permit operation of the vehicle in the forward direction or in reverse. The gearing may also provide for one or more steps of gear reduction. However, there is no clutch or fluid coupling in the transmission. One or more accessories such as a generator shown at 14 may be mounted on or adjacent the turbine housing to be driven by the turbine in a manner which will be described below.

The combustion engine 8 includes an air compressor indicated generally at 16. The compressor shown in Fig. 2 is a two stage axial flow compressor, but it will be understood that any suitable compressor may be used. Air enters the compressor through inlet 18, and is discharged into an annular space or chamber 20. From chamber 20, the air passes into another annular chamber 22 by way of passages shown in dotted lines at 24.

From the annular chamber 22, compressed air flows through the tubes 26 of a heat exchanger 28, discharging from the heat exchanger into another annular chamber 30, whence it passes into combustion chamber 32 by way of a plurality of openings, some of which are shown at 33. Fuel is injected into the combustion chamber by any suitable means such as a fuel nozzle 34. Initial ignition may be accomplished by an igniter such as is shown at 35.

From the combustion chamber, air flows to an annular ring of guide vanes 36 to a pair of bucket wheels 38 and 40. An annular ring of guide vanes 42 receives the flow of gas leaving the buckets of wheel 38 and directs the gas into the buckets of wheel 40. Gas leaving the buckets of wheel 40 is discharged into an annular chamber 44, whence it passes through a ring of guide vanes 46 into the buckets of turbine wheel 48. A valve 58 is positioned as shown in Fig. 3 to enable hot gases from chamber 44 to by-pass turbine wheel 48. With valve 58 open hot gases flow from chamber 44 through passage 60 into the annular space 64 partially occupied by the tubes of heat exchanger 28. From the annular chamber 64, the gases leave the heat exchanger as exhaust gases by way of openings 66.

The rotating blades or buckets of compressor 16 are mounted on a hollow shaft 68 which is splined to a shaft 70. Shaft 68 carries a bevel gear 72 which meshes with another bevel gear 74. Gear 74 drives an accessory drive shaft 76. Shaft 76 carries a bevel gear 78 which meshes with a bevel gear 80. Bevel gear 80 is connected to drive one or more accessories such as the generator 14 shown in Fig. 1.

Shaft 70 is splined to and driven by the hub 82 of bucket wheel 40. Bucket wheels 38 and 40 are rotatably mounted in anti-friction bearings 84 and 86. The two bucket wheels 38 and 40 rotate as a unit by virtue of a welded joint 88. Welded joint 88 is shown in detail in Fig. 7. As can be seen from the figure, welded joint 88 comprises a cavity formed by the adjoining bucket wheels 38 and 40 which is filled with weld metal 90. Weld metal 90 is machined after welding to form a pair of annular seals 92. The seals 92 act as labyrinth seals to guard against gas leakage between the two moving stages represented by bucket wheels 38 and 40. The two rings 92 serve as seals by cooperating with the inside diameter of diaphragm 94.

A hollow shaft 96 envelopes shaft 70 and is rotatably mounted in anti-friction bearings 98 and 100. The turbine or bucket wheel 48 is mounted at one end of hollow shaft 96, and at the other end of the shaft there is a bevel gear 102. Gear 102 meshes with another bevel gear 104 to which is splined the main drive shaft 106.

Bearings 98 and 100 are supported in and by a structure which may conveniently be called an inner cone 108. At its left end (Fig. 2), cone 108 is supported by the housing which forms the annular chamber 22. At its right end (Fig. 3), cone 108 is supported in part by its own rigidity and also in part by a structure which may be called outer cone 110. The means by which outer cone 110 supports inner cone 108, as shown in Fig. 3, is the radial pin ring indicated generally at 112. This radial pin ring consists of a plurality of pins 114 secured annularly about the end of outer cone 110, the axes of pins 114 being arranged radially to converge or intersect at a common center which lies substantially in the axis of rotation of coaxial shafts 70 and 96. The inner ends of pins 114 engage a ring 116 on which is mounted the end of inner cone 108 and bearing 98. Ring 116 is provided with a plurality of radially aligned openings which cooperate with the pins 114. Pins 114 are radially movable relatively to the openings in ring 116, but are restrained against circumferential relative movement. In this manner, radial pin ring 112 provides adequate support while at the same time permitting differential expansion among the various portions of the structure to prevent the setting up of stresses which might otherwise cause failures of the structure.

The principles on which the radial pin ring functions are described, and certain physical embodiments thereof are claimed, in patent application Ser. No. 668,558, filed May 9, 1946, and assigned to the assignee of this invention.

Outer cone structure 110 is strengthened by the use of circumferentially spaced ribs 118. The right end of outer cone 110 (Fig. 3) is supported by the ring 120 which in turn is supported by the outer portion of the housing which forms the annular chamber 30.

The left end of outer cone 110 (Fig. 2) is supported in the housing which forms the annular chamber 22 by means of an axial pin ring indicated generally at 122, and which is shown in greater detail in Figs. 5 and 6. As can be seen in Figs. 2, 5, and 6, an annular ring 124 is integral with inner cone 108 and is supported on the housing of chamber 22. Ring 124 carries a support ring 126 which is provided with a plurality of circumferentially spaced pins 128 having square heads 130. It is not essential that the heads 130 be squared, but it is important for the purposes of this mounting means that the sides 132 of head 130 be substantially plane and that these planes be parallel to each other and substantially parallel to the axis of rotation of shafts 70 and 96.

A support ring 134, integral with outer cone 110, is provided with a plurality of slots 136. Slots 136 have sides 138 which consist of planes which are parallel to each other and are substantially parallel to the axis of rotation of shaft 70. Each head 130 is machined to fit in its cooperating slot 136 in such a way that relative movement between the two is possible. Thus the head 130 is movable axially and radially relatively to its cooperating slot 136, but is not movable circumferentially relatively thereto.

Bearing 84 is supported by diaphragm 140 which in turn is carried by ring 120. Bearing 86 is supported by a radial pin ring 142 which is similar to the radial pin ring 112, so no effort will be made here to describe the pin ring 142 in detail.

Operation

In operation, compressed air from the compressor 16 picks up heat in the heat exchanger 28 and passes it to the combustion chamber 32. Here fuel is added and the mixture is ignited. The resultant hot gases pass to the several turbine wheels serially, going first to bucket wheel 38, then to bucket wheel 40, and then to bucket wheel 48. The bucket wheels 38 and 40 are welded together and rotate at a substantially constant speed, or at worst, at a speed which varies over a rather narrow range. Turbine wheels 38 and 40 drive the compressor through the shaft 70.

Turbine wheel 48 drives the vehicle through the direct drive transmission 10 and shaft 106 and 96. Inasmuch as the vehicle speed must be variable, some means for varying the speed of turbine wheel 48 must be provided. This is accomplished by the valve 58 which permits the by-passing of hot gases around turbine wheel 48.

Exhaust gases leaving the turbine wheels flow outward radially over the outsides of tubes 26, giving up some of their remaining energy to the air inside the tubes.

Differential expansion among the structural members is permitted through the use of axial pin ring 122 and radial pin rings 112 and 142.

I claim:
1. An axial flow internal combustion turbine engine comprising a compressor and a pair of axially aligned power turbines both axially aligned with said compressor, an inner casing provided with bearings for supporting said power turbines and said compressor and having an extension extending axially rearwardly of said power turbines and providing a combustion chamber, an outer annular casing encircling said inner casing and providing an axial flow air passage connecting the combustion chamber with said compressor and having a heat exchange unit, the hot gases generated in said combustion chamber being successively conducted to said power turbines and thence radially outwardly across said air passage in cooperation with said heat exchange unit, said power turbines relatively closely spaced to minimize pressure drop therebetween, the intermediate chamber between said power turbines extending radially outwardly beyond the extremities of said power turbines, and valve means associated with said intermediate chamber and operable to selectively open said chamber to the chamber externally of the inner casing on the exhaust side of the sec- ond power turbine, whereby to by-pass varying quantities of the hot gases around said second turbine, said second turbine operatively connected with a power take-off shaft, said first turbine operatively connected with said compressor.

2. An axial flow internal combustion turbine engine comprising a compressor and a pair of axially aligned power turbines both axially aligned with said compressor, an inner casing provided with bearings for supporting said power turbines and said compressor and having an extension extending axially rearwardly of said power turbines and providing a combustion chamber, an outer annular casing encircling said inner casing and providing an axial flow air passage connecting the combustion chamber with said compressor and having a heat exchange unit, the hot gases generated in said combustion chamber being successively conducted to said power turbines and thence radially outwardly across said air passage in cooperation with said heat exchange unit, said power turbines relatively closely spaced to minimize pressure drop therebetween, the intermediate chamber between said power turbines extending radially outwardly beyond the extremities of said power turbines and providing a free unobstructed relatively short axial passage for the flow of hot gases from the exhaust of one power turbine to the intake of said other power turbine, and valve means in said outwardly extending chamber portion and operable to selectively open said chamber to that chamber portion externally of the inner casing on the exhaust side of the second power turbine, whereby to by-pass varying quantities of the hot gases around said second turbine, said second turbine operatively connected with a power take-off shaft, said first turbine operatively connected with said compressor.

3. An axial flow internal combustion turbine engine comprising a compressor and a pair of axially aligned power turbines both axially aligned with said compressor, an inner casing provided with bearings for supporting said power turbines and said compressor and having an extension axially rearwardly of said power turbines and providing a combustion chamber, an outer annular casing encircling said inner casing and providing an axial flow air passage connecting the combustion chamber with said compressor and having a heat exchange unit, the hot gases generated in said combustion chamber being successively conducted to said power turbines and thence radially outwardly across said air passage in cooperation with said heat exchange unit, said power turbines relatively closely spaced to minimize pressure drop therebetween, the intermediate chamber between said power turbines extending radially outwardly beyond the extremities of said power turbines and providing a free unobstructed relatively short axial passage for the flow of hot gases from the exhaust of one power turbine to the intake of said other power turbine, and valve means in said outwardly extending chamber portion and operable to selectively open said chamber to that chamber portion externally of the inner casing on the exhaust side of the second power turbine, whereby to by-pass varying quantities of the hot gases around said second turbine, a power take-off shaft, a tubular shaft supported by said inner casing and drivingly connecting said second turbine with said power take-off shaft, and a compressor drive shaft supported by said inner casing and extending axially through said tubular shaft and drivingly connecting said first turbine with said compressor.

JOHN R. McVEIGH.

REFERENCES CITED

The following references are of record in the file of this patent:

UNITED STATES PATENTS

| Number | Name | Date |
|---|---|---|
| 2,085,761 | Lysholm | July 6, 1937 |
| 2,095,991 | Lysholm | Oct. 19, 1937 |
| 2,358,301 | Brauns | Sept. 19, 1944 |
| 2,399,046 | Larrecq | Apr. 23, 1946 |
| 2,476,179 | Cameron | July 12, 1949 |
| 2,477,798 | Griffith | Aug. 2, 1949 |
| 2,504,181 | Constant | Apr. 18, 1950 |

FOREIGN PATENTS

| Number | Country | Date |
|---|---|---|
| 213,793 | Switzerland | June 3, 1941 |
| 865,670 | France | May 31, 1941 |